Inventor:
Otto H. Schade
By [signature]
Attorney

Inventor:
Otto H. Schade
By Claude C. Mitchell
Attorney

Patented Jan. 22, 1952

2,583,345

UNITED STATES PATENT OFFICE 2,583,345

APPARATUS FOR MODIFYING THE TRANSFER CHARACTERISTICS OF A VACUUM TUBE

Otto H. Schade, West Caldwell, N. J., assignor to Radio Corporation of America, a corporation of Delaware Application December 9, 1947, Serial No. 790,582

8 Claims. (Cl. 179—171)

The present invention relates in general to amplifier tubes and, more particularly, relates to means for modifying the transfer characteristics of such a tube by the use of a non-linear cathode load resistance.

It is frequently desirable in electronic circuits to employ an amplifier tube the conduction characteristics of which are such that the output of the tube will be generally proportional to the input over a portion of its operating range only. Such a characteristic is particularly useful in circuits designed to limit the amplitude of an input signal to a certain maximum value. In radio receiving systems, for example, a circuit of this type aids in the elimination of noise or other spurious signals which extend above the amplitude of the signal conveying the desired intelligence.

Another adaptation of a circuit of the above nature is in the television field where it is desired to control the contrast of the reproduced image by means known as gamma correction. In order to act as a satisfactory gamma control, the circuit should provide maximum non-linearity in that portion of the tube operating range giving maximum gain. This has previously been accomplished, for example, by utilizing one or more electron discharge devices connected in parallel relation in the output circuit of the amplifier, and by further providing each of such electron discharge devices with a different bias voltage so that each will become effective at different levels. By a suitable choice of such bias voltages, the overall transfer characteristic of the amplifier stage may be changed at will.

A still further advantage obtained by modifying the characteristic curve of an amplifier stage so that the amplifier tube will provide different degrees of amplification in different portions of its operating range is that the portion of a television video signal which contains the synchronizing information and black level may be expanded in amplitude as contrasted with that portion of the television signal containing the image intelligence or video information. This is important to counteract compression of this portion which may occur in the video amplifier or transmitter modulator.

As above mentioned, attempts have previously been made to accomplish similar results by utilizing one or more electron discharge devices in the output circuit of the amplifier tube and by so arranging these electron discharge devices that they will be conductive within various predetermined portions of the total operating range of the amplifier. Such an arrangement has serious drawbacks, however, due to the fact that an adequate output from the amplifier tube requires either a tube of large capacity or a decreased load resistor, or both. The use of a large tube is undesirable since it increases the cost of the apparatus, and the use of a small load resistor or impedance cuts down the signal output. These expedients are needed to counteract the loss of high frequencies because of the various added shunting capacities in these circuits.

It has been found that the above disadvantages may be eliminated without the employment of additional components by utilizing a variable-impedance electron discharge device connected in the cathode circuit of the amplifier tube in parallel with the tube cathode resistor. Furthermore, measurements have shown that the gain and signal output capability of the system is increased to a considerable degree by the use of such an arrangement. This results from a reduction in the shunting capacity in the output circuit of the amplifier tube which, in turn, permits the employment of a higher value of load resistance. Still further, the output power requirements of the amplifier tube may in comparison with other circuits in many cases be reduced with a consequent saving in cost.

One object of the present invention, therefore, is to provide improved means for modifying the transfer characteristics of an amplifier tube.

Another object of the invention is to provide an amplifier tube with a non-linear cathode load resistance.

A further object of the invention is to provide an amplifier tube with a cathode load impedance consisting of the parallel combination of a resistor and a diode, the latter being so biased as to cut off suddenly or gradually when the current in the amplifier tube reaches a predetermined level.

A still further object of the invention is to provide an amplifier tube with a cathode load impedance comprising a resistor in parallel with a grid-controlled electron discharge device, and to control the conduction of this electron discharge device by placing a suitable bias voltage on the grid thereof.

An additional object of the invention is to provide an amplifier tube with a cathode load impedance consisting of a resistor in parallel with a plurality of electron discharge devices which are so biased as to cut off at different values of current flow through the amplifier tube.

Other objects and advantages will be apparent from the following description of preferred forms of the invention and from the drawings, in which.

Figure 1:
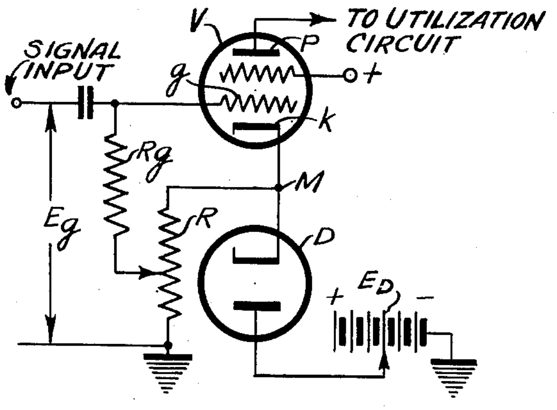
Fig. 1 is a circuit diagram of a preferred form of the present invention.

Referring first to Fig. 1 there is shown an amplifier tube V having a plate *p*, a control grid *g*, and a cathode *k*. The control grid *g* of tube V is adapted to receive an input signal, while the plate *p* is connected to some suitable utilization circuit (not shown). A diode D has its cathode connected as shown to the cathode *k* of tube V, and its anode connected to a point of positive polarity on a battery or other source of positive bias voltage $E_D$. The negative terminal of battery $E_D$ is grounded. A resistor R is connected between the cathode *k* of tube V and ground so as to be effectively in shunt with the series combination of diode D and battery $E_D$. A further resistor $R_g$ is connected between the grid *g* of tube V and some point on the resistor R.

It will now be seen that the signal voltage $E_g$ required to produce a given plate current in tube V is the sum of the grid-to-cathode voltage on tube V ($E_{c_1}$) plus the voltage drop across the tube cathode impedance. This cathode impedance includes the resistor R in parallel with the series combination of diode D and battery $E_D$. Hence, the voltage at point M (or, in other words, on the cathode *k*) is the instantaneous sum of the currents in tubes V and D and through resistor R. Since the respective currents through the tubes V and D are in opposition to one another at point M, it follows that the current through diode D is at a maximum when the current through tube V is zero. In other words, the diode current is greatest when the amplifier tube is cut off by an applied signal $E_g$. Conversely, the current through diode D becomes zero when the voltage at point M becomes positive by an amount equal to the bias voltage $E_D$ as a result of a high value of current flow through the amplifier tube V.

Figure 2:
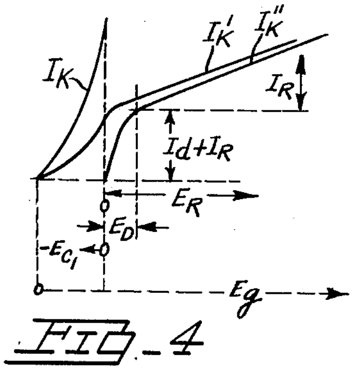
Figs. 2 and 3 are graphs explaining the operation of the circuit of Fig. 1.

Such operation can be more clearly understood by reference to the curves of Fig. 2, in which the normal plate or cathode current of tube V (neglecting the diode D) is designated by the symbol $I_k$. The point of intersection of the curve $I_k$ with the voltage axis is determined by the magnitude of the bias voltage $E_{c_1}$ applied to the grid *g*. As a result of the presence of the diode D, however, the resultant characteristic of the cathode or plate current of tube V as plotted against the signal input $E_g$ will be as shown by the curve $I'_k$. This curve $I'_k$ represents the sum of the currents through the two tubes V and D plus the current through the resistor R. Currents will flow through all of these elements until such time as the current flow through tube V (as the result of an increased signal input $E_g$) reaches a point where the voltage at M cuts off the diode current. This cut-off point is represented by the bend, or knee, in the characteristic curve $I'_k$. The location of this bend, or knee, in the tube characteristic is obviously a function of the value of diode bias $E_D$ which, in turn, determines the value of current $I_D$ at which the diode cuts off. Beyond this bend in the characteristic curve, the slope is linear, since the total current of V then flows through the resistor R alone.

Fig. 2 additionally shows the characteristic curve obtained for current and voltage in the cathode circuit of V. This curve is designated as $I''_k$. As in the case of curve $I'_k$, the slope is substantially that of the diode characteristic to the current cut-off level in the diode which is, as previously stated, determined by the bias voltage $E_D$. Beyond the knee only the value of resistor R is a factor in determining the slope of the remaining linear portion of the curve.

Figure 3:
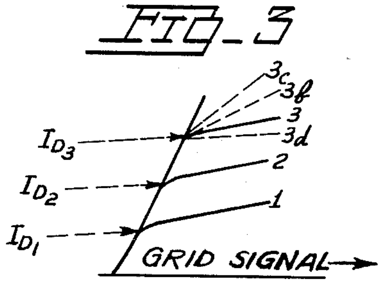

The result of varying the value of resistor R is more fully illustrated in Fig. 3 for a particular diode current cut-off level designated as $I_{D_3}$. In this Fig. 3 the solid line portions of the curve are drawn for various diode current cut-off conditions $I_{D_1}$, $I_{D_2}$, and $I_{D_3}$ obtained by progressively increasing the positive diode bias voltage $E_D$. For the condition $I_{D_3}$ a decrease in value of resistor R causes a corresponding change in the slope of the tube characteristic as shown by the broken line $3_b$. A still further decrease in the value of resistor R gives the broken line characteristic portion $3_c$. An increase in resistor value, however, changes the slope in the manner shown by the broken line $3_d$.

Figure 4:
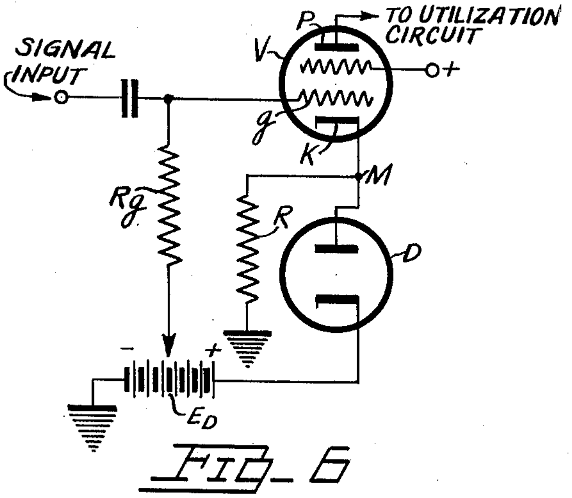
Fig. 4 is a circuit diagram of a modification of Fig. 1.
Figure 5:
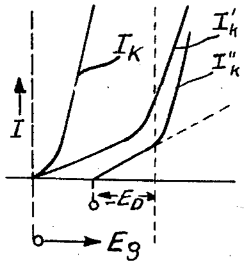
Figs. 5, 6 and 7 are graphs explaining the operation of the circuit of Fig. 4.

In Fig. 4 there is shown a modification of the circuit of Fig. 1 in which the connections to the diode D are reversed, so that the anode of the diode is connected to the cathode *k* of tube V and the cathode of the diode connected to the positive terminal of the source of bias voltage $E_D$. The result of such a reversal in polarity of the diode is shown graphically in Fig. 5. From the latter figure, it will be seen that, instead of conducting during the initial portion of the signal applied to the grid *g* of tube V, the diode D remains cut off until such time as the flow of current through the amplifier tube increases the positive voltage at point M to a value above that of the negative bias battery $E_D$. In other words, the current characteristic $I''_k$ is linear and coincides with the resistance line R between the voltage limits of zero and $-E_D$. At the latter limit, however, the diode D begins to conduct, and the cathode current of tube V is divided between the resistor R and the diode D. As a consequence, the curve $I''_k$ bends at the voltage limit $E_D$ and follows a path such as indicated in Fig. 5. As in the case of Fig. 2, the slope of the resistance line R is determined by the particular value of resistance chosen.

Figure 6:
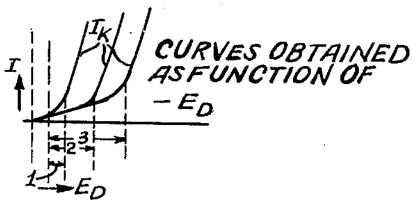

Fig. 6 illustrates the effect of varying the value of the bias voltage $E_D$ in Fig. 4. By increasing the value of this bias potential, the knee or bend in the characteristic curve of the amplifier tube may be made to occur further along the voltage axis.

Figure 7:
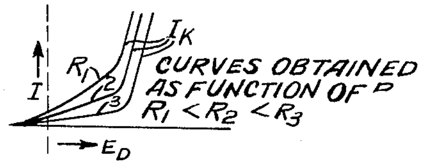

Fig. 7 shows the manner in which the initial slope of the tube characteristic of Fig. 6 is dependent upon the particular value of resistance chosen for R. By decreasing the value of this resistance, the angle made by the initial portion of the tube characteristic with the voltage axis is progressively decreased.

Figure 8:
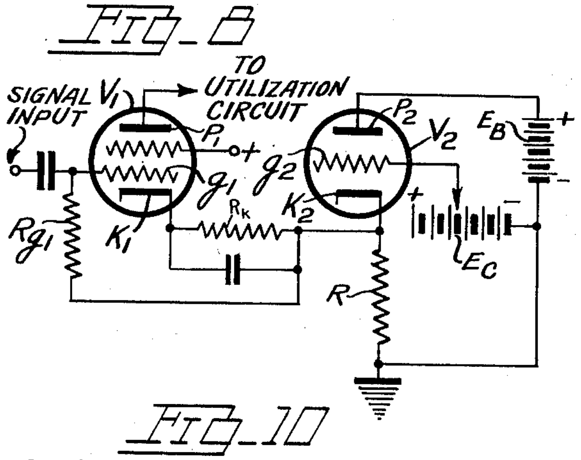
Fig. 8 is a circuit diagram of a further modification of Fig. 1.

Fig. 8 illustrates a further modification of Fig. 1 utilizing a triode $V_2$ in shunt with the resistor R rather than the diode D of Fig. 1. By the use of such a triode, it is possible to vary the cut-off point of the tube by means of a grid bias battery $E_c$ rather than by varying the positive voltage applied to the anode of diode D as in Fig. 1.

Figure 9:
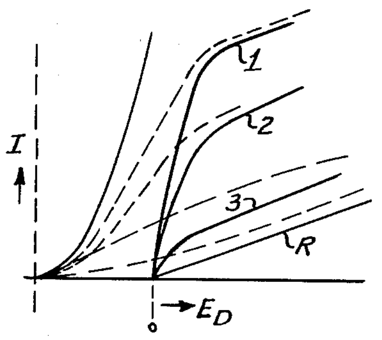
Fig. 9 is a family of curves useful in explaining the operation of the circuit of Fig. 8.

Fig. 9 illustrates a family of curves explaining the operation of the circuit of Fig. 8. As in the curves of Fig. 2, the location of the bend or knee is determined by the point at which the triode $V_2$ begins to conduct, and the slope of the current curve subsequent to that point is dependent upon the value of resistor R. The solid line R in Fig. 9 shows the linear characteristic of the amplifier tube $V_1$ which is obtained when the triode $V_2$ is cut off over the entire operating range of the amplifier tube. The family of broken-line curves in Fig. 9 is plotted for a selected value of negative bias applied to the grid $g_1$ of tube $V_1$ and is depending upon a particular value for the biasing resistor $R_k$ of Fig. 8.

Figure 10:
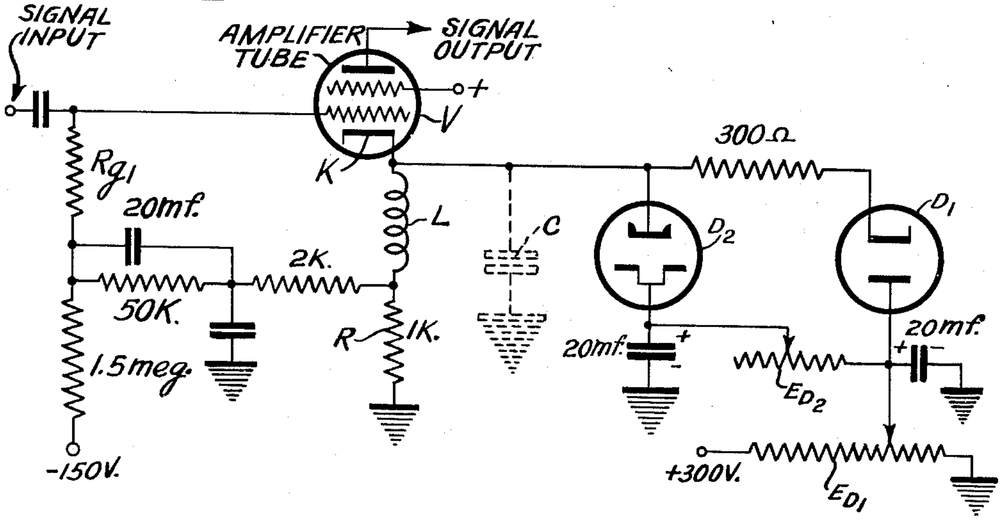
Fig. 10 is a circuit diagram of a further modification of Fig. 1.

In Fig. 10 there is shown a commercially practical circuit embodying the principles above set forth. A pair of electron discharge devices $D_1$ and $D_2$ are connected functionally in parallel relation. As shown in the drawing, the electron discharge device $D_1$ is connected to an adjustable source of bias potential $E_{D_1}$, so that the current flow $I_k$ in the amplifier tube V will have an initial bend or knee at the level $I_{D_1}$ at which the diode $D_1$ begins to conduct. This level $I_{D_1}$ in turn is dependent upon the value of bias voltage $E_{D_1}$.

Figure 11:
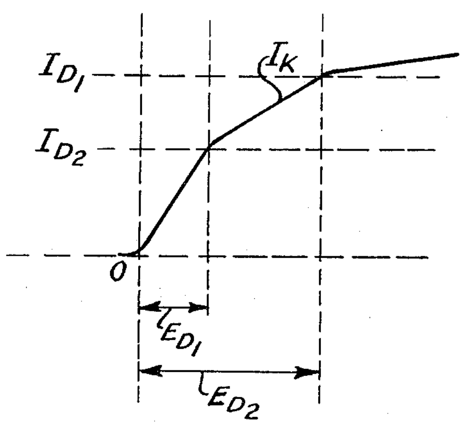
Figs. 11 and 12 are graphs illustrating certain characteristics of the circuit of Fig. 10.

A second electron discharge device has its anode connected to the bias source $E_{D_1}$ through an adjustable resistor which effectively acts as a second source of bias potential $E_{D_2}$. By suitably adjusting this resistor to vary the bias voltage $E_{D_2}$, the diode $D_2$ may operate to cut off at a different point than the diode $D_1$, and thus produce a second knee or bend in the current curve $I_k$ of tube V at the level $I_{D_2}$. As shown in Fig. 11, this current level $I_{D_2}$ is determined by the value of bias voltage $E_{D_2}$ similar to the manner in which the bias voltage $E_{D_1}$ determines the current level $I_{D_1}$. It will thus be appreciated that Fig. 10 provides means whereby the transfer characteristics of tube V may be chosen so as to provide selective control over the output of the amplifier tube as a function of the amplitude of the input signal. It will be obvious that additional electron discharge tubes in parallel with $D_1$ and $D_2$ may be added so as to bring about additional points of curvature in the transfer characteristic $I_k$.

Figure 12:
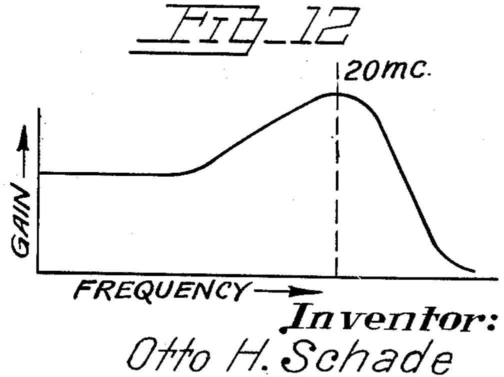

It will be further noted that the circuit of Fig. 10 is especially adapted for use where it is desired to increase the gain of the amplifier tube as a direct function of an increase in signal frequency. In the arrangement of Fig. 10 the frequency response is made uniform by the use of an inductor L connected between the cathode $k$ of tube V and one end of resistor R. When omitting or decreasing this inductor L, the cathode impedance of tube V will decrease as a direct function of frequency because of shunt capacities C in the circuit, thus providing higher gain at the higher frequency levels. The circuit components of Fig. 10 may be chosen, for example, to have the values set forth, in which case the circuit will provide maximum gain near the maximum frequency passed by the circuit, as, for example, a frequency of 20 megacycles (see Fig. 12). This is in direct contrast to circuits previously known in the art, in which the shunting capacity in the output circuit causes a falling off of gain at the higher frequencies rather than the increase in gain which results from the use of applicant's disclosure.

It will thus be seen that applicant has provided a system which is extremely useful in cases where the output of an amplifier tube is to be compressed to certain prescribed values relative to input signal amplitude and in which the degree of compression can be made a function of frequency. Furthermore, the use of circuits such as shown herein provides a simple way of bringing about control over the gamma of a television signal to thereby effect proper contrast in the reproduced image. Still further, the use of these circuits permits remote volume control, or gain control, in circuits utilizing input signals having a low percentage of distortion. It should still further be noted that, by the use of applicant's circuits, it is possible to achieve these results without interfering with the circuit constants of any filter combinations which may be utilized in the output of the amplifier tube.

Having thus described my invention, I claim:

1. In a signal channel, an electrical signal translating circuit comprising in combination: an electronic discharge tube having at least an anode, a cathode, and a control electrode, a cathode impedance connected between the cathode of said electron discharge device and a point of fixed potential, a tap on said cathode impedance, a resistance connected from said tap to said control electrode, a plurality of unilateral current conducting devices each having at least a cathode and an anode, connections from each of said unilateral current conducting devices cathodes to said electron discharge tube cathode, a plurality of bias supply terminals each supplying a different value of positive bias voltage referenced with respect to the point of fixed potential, a separate circuit from each of said unilateral conducting devices anode to a corresponding and respective one of said plurality of bias supply terminals.

2. In a signal channel, an electrical signal translating circuit comprising in combination: an electron discharge tube having at least an anode, a cathode, and a control electrode, a point of fixed potential, a negative bias supply terminal referenced to said point of fixed potential, an input impedance connected between said negative bias supply terminal and said discharge tube control electrode, a cathode impedance connected between the cathode of said electron discharge device and said point of fixed potential, a galvanic connection between a point on said cathode impedance and a point on said input impedance, a plurality of unilateral current conducting devices each having at least a cathode and an anode, connections from each of said unilateral current conducting devices cathodes to said electron discharge tube cathode, a plurality of bias supply terminals each supplying a different value of positive bias voltage referenced with respect to the point of fixed potential, a separate circuit from each of said unilateral conducting devices anode to a corresponding and respective one of said plurality of bias supply terminals.

3. Apparatus according to claim 2 wherein said cathode impedance includes an inductive portion and a resistive portion and wherein a part of said cathode impedance inductive portion is included between said discharge tube cathode and the point on said cathode impedance to which said galvanic connection is made.

4. In a signal channel, an electrical signal translating circuit comprising in combination: an electron discharge tube having at least an anode, a cathode, and a control electrode, a point of fixed potential, a negative bias supply terminal referenced to said point of fixed potential, an input impedance connected between said negative bias supply terminal and said discharge tube control electrode, a cathode impedance connected between the cathode of said electron discharge device and said point of fixed potential, a connection between a point on said cathode impedance and a point on said input impedance, a plurality of unilateral current conducting devices each having at least a cathode and an anode, connections from each of said unilateral current conducting devices cathodes to said electron discharge tube cathode, a plurality of bias supply terminals each supplying a different value of positive bias voltage referenced with respect to the point of fixed potential, a separate circuit from each of said unilateral conducting devices anode to a corresponding and respective one of said plurality of bias supply terminals.

5. Apparatus according to claim 2 wherein said galvanic connection includes a feedback resistance and wherein a first capacitor is shunted across a portion of said feedback resistance while a second capacitor is connected from a point on said feedback resistance and said point of fixed potential.

6. In a signal channel, an electrical signal translating circuit comprising in combination: an electron discharge tube having at least an anode, a cathode, and a control electrode, a cathode impedance connected between the cathode of said electron discharge device and a point of fixed potential, a tap on said cathode impedance, a resistance connected from said tap to said control electrode, a plurality of unilateral current conducting devices each having at least a cathode and an anode operating electrode, connections from one electrode on each of said unilateral current conducting devices to said electron discharge tube cathode, a plurality of bias supply terminals each supplying a different value of bias voltage referenced with respect to the point of fixed potential, a separate circuit from the other electrode of each of said unilateral current conduction devices to a corresponding and respective one of said plurality of said bias supply terminals.

7. In a signal channel, an electrical signal translating circuit comprising in combination: an electron discharge tube having at least an anode, a cathode, and a control electrode, a point of fixed potential, a negative bias supply terminal referenced to said point of fixed potential, an input impedance connected between said negative bias supply and said discharge tube control electrode, a cathode impedance connected between the cathode of said electron discharge device and said point of fixed potential, a galvanic connection between a point on said cathode impedance and a point on said input impedance, a plurality of unilateral current conducting devices each having at least a cathode and an anode operating electrode, connections from an electrode on each of said unilateral current conducting devices to said electron discharge tube cathode, a plurality of bias supply terminals each supplying a different value of bias voltage referenced with respect to the point of fixed potential, a separate circuit for each of said unilateral current conduction devices to a corresponding and respective one of said plurality of said bias supply terminals.

8. Apparatus according to claim 7 wherein said cathode impedance includes an inductive portion and a resistive portion and wherein a part of said cathode impedance inductive portion is included between said discharge tube cathode and the point on said cathode impedance to which said galvanic connection is made.

OTTO H. SCHADE.

REFERENCES CITED

The following references are of record in the file of this patent:

UNITED STATES PATENTS

| Number | Name | Date |
|---|---|---|
| 2,215,777 | Benz | Sept. 24, 1940 |
| 2,222,933 | Blumlein | Nov. 26, 1940 |
| 2,261,335 | Braden | Nov. 4, 1941 |
| 2,383,420 | Scoles | Aug. 21, 1945 |